United States Patent
Layne

[11] Patent Number: 5,584,373
[45] Date of Patent: Dec. 17, 1996

[54] CONVEYOR SYSTEM WITH PASSIVE ROLLER TRANSFER ASSEMBLY

[75] Inventor: James L. Layne, Scottsville, Ky.

[73] Assignee: Span Tech Corporation, Glasgow, Ky.

[21] Appl. No.: 451,614

[22] Filed: May 26, 1995

[51] Int. Cl.$^6$ ............................................. B65G 43/00
[52] U.S. Cl. .................... 198/464.4; 198/502.1; 198/600
[58] Field of Search ................... 198/600, 635, 198/502.1, 464.4, 571–573, 719, 325, 592, 861.5

[56] References Cited

U.S. PATENT DOCUMENTS

| | | | |
|---|---|---|---|
| 2,030,103 | 2/1936 | Dunlop. | |
| 2,109,210 | 2/1938 | Dunlop. | |
| 2,536,961 | 1/1951 | Smith | 198/600 X |
| 2,569,711 | 10/1951 | Foster | 198/600 X |
| 2,624,444 | 1/1953 | Casabona. | |
| 3,206,001 | 9/1965 | Peppler | 198/600 X |
| 3,251,458 | 5/1966 | Niekamp et al. | 198/635 X |
| 3,853,212 | 12/1974 | Downes | 198/600 X |
| 3,951,255 | 4/1976 | Shuttleworth et al. | |
| 4,313,536 | 2/1982 | Fauth. | |
| 4,319,676 | 3/1982 | Turnbough. | |
| 4,448,302 | 5/1984 | Weaver et al. | |
| 5,009,307 | 4/1991 | Chance et al. | |
| 5,215,182 | 6/1993 | Garbagnati. | |

*Primary Examiner*—D. Glenn Dayoan
*Attorney, Agent, or Firm*—King and Schickli

[57] ABSTRACT

A conveyor system with an improved roller transfer assembly is provided for transferring articles from the end of a first conveyor to the start of a second, in-line conveyor. A conveying surface is formed by a plurality of rollers that span substantially the entire space across the transfer zone. The conveyor transfer assembly includes a plurality of shafts extending transversely across the zone, a mounting block at each end for supporting the shafts, which blocks are secured within a holding pan. The support for the assembly includes a pair of tabs on each end of the pan that cooperate with a respective pair of open notches on a pair of frame plates. In turn, the plates are secured at the ends of the transfer zone to the frame of the conveyor system. A pair of angular slots in the plates allows adjustment of the transfer assembly to allow movement of the articles from one level on the first conveyor to a second level on the second conveyor.

11 Claims, 3 Drawing Sheets

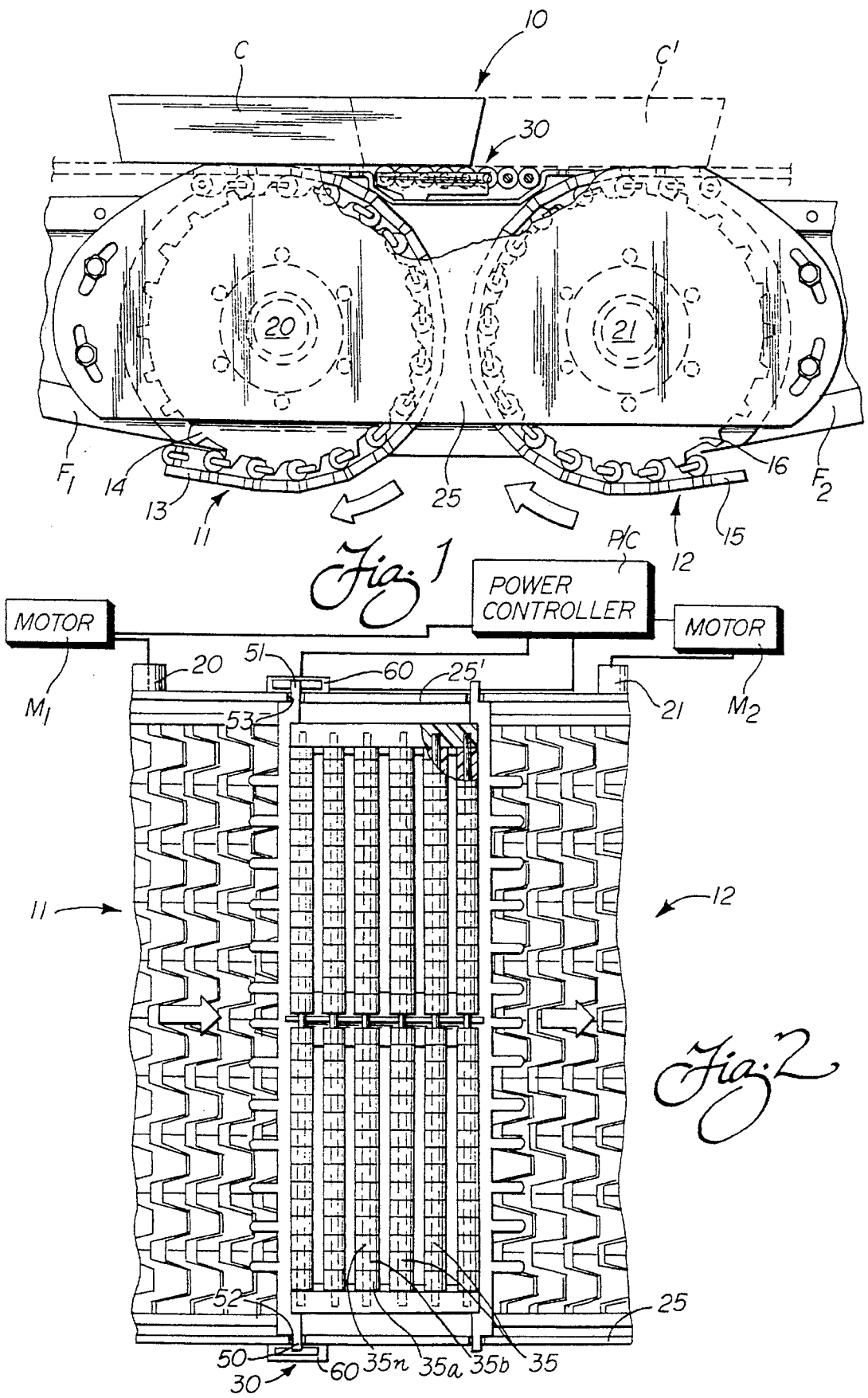

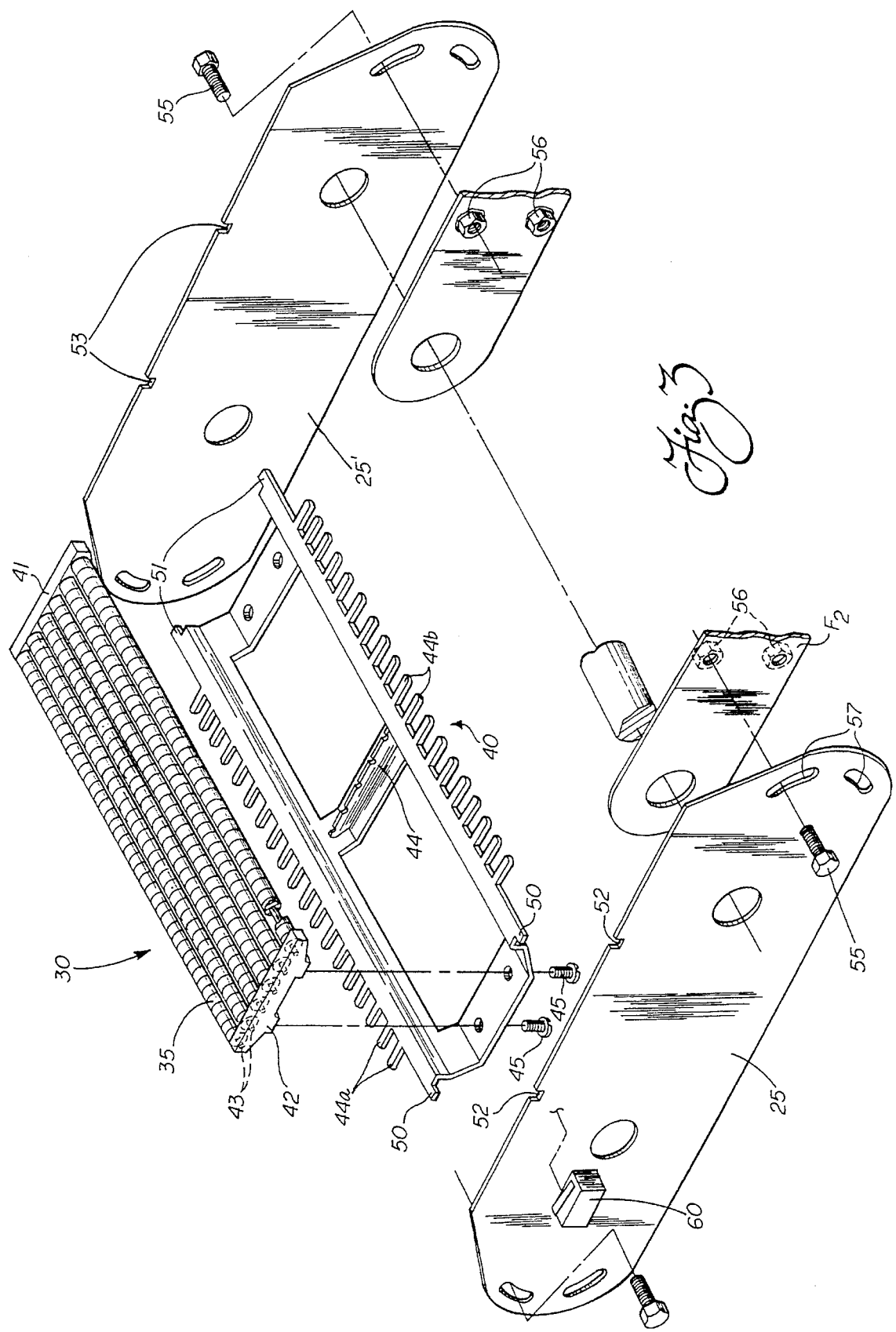

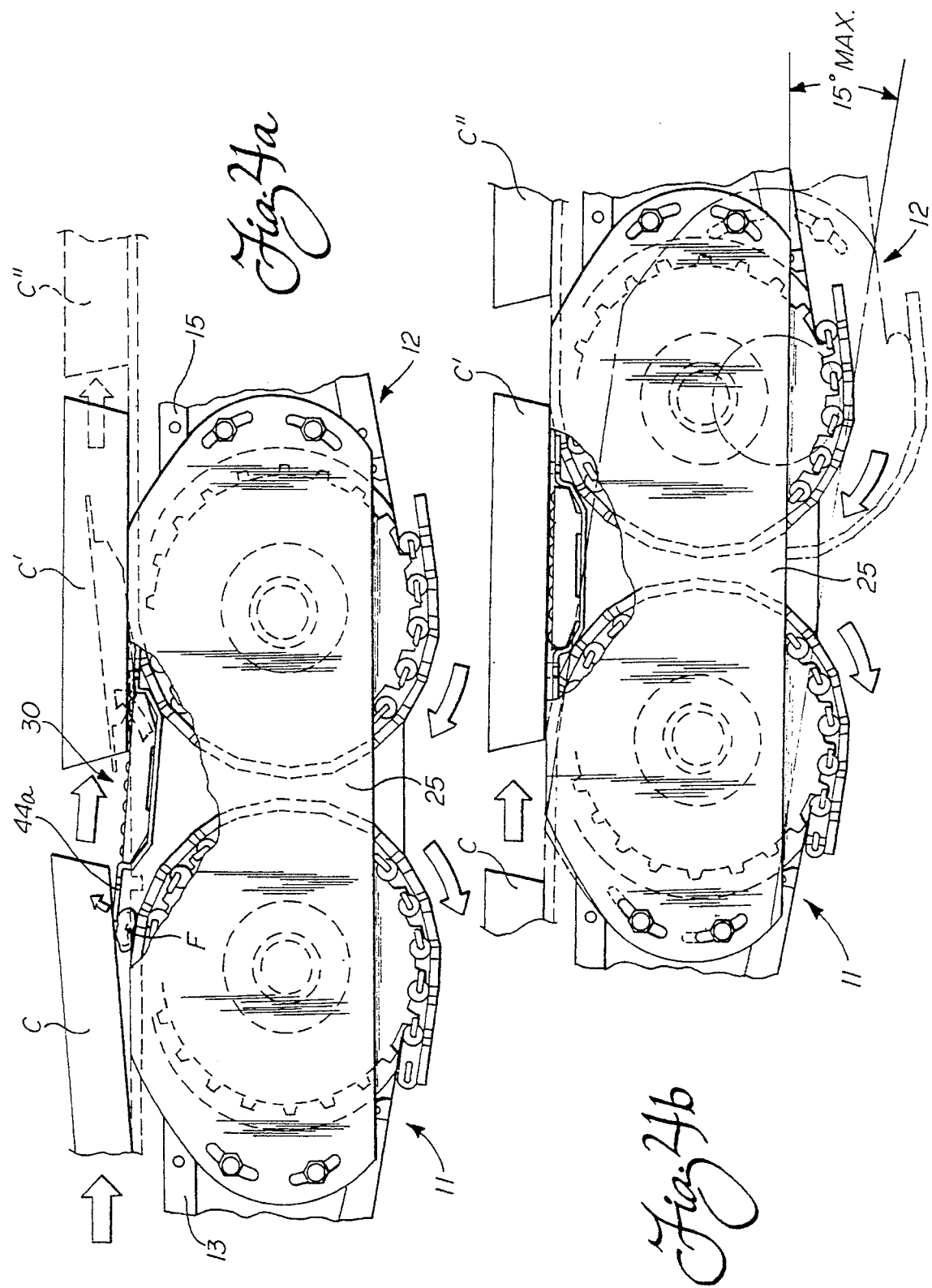

CONVEYOR SYSTEM WITH PASSIVE ROLLER TRANSFER ASSEMBLY

BACKGROUND OF THE INVENTION

The present invention relates generally to conveyors, and more particularly to a conveyor system having a transfer zone between the end of a first conveyor and the start of a second conveyor.

It is common in conveyor systems to have two or more conveyors that are positioned in end to end relationship that are adapted to feed articles along a feed path, such as in food processing or packaging lines. In the transfer zone where the two conveyors come together, it has always been a problem to provide an efficient passage of the articles from the feeding portion of the first conveyor to the receiving portion of the second conveyor. One of the most prevalent problems is to provide a conveyor transfer assembly for this purpose that not only provides for a smooth transition along the transfer zone, but also can be released in the event that a jam occurs. For example, a jam can occur at the transfer zone due to the lodging of a foreign object within a recess of the modular conveyor, or simply from an object that is out of place carried along by the article being conveyed. In either case, there is a problem in preventing damage to the articles and/or the conveyor in the event of this type of jam.

In the past, there have been attempts to solve this problem, but insofar as I am aware a truly acceptable solution has not been found prior to the present invention. For example, in the Chance U.S. Pat. No. 5,009,307, to et al. issued Apr. 23, 1991, there is a provision for a plate that is held in position by the frame on one end of a conveyor. In order to hold the plate in position, spring loaded detents are required at both sides. Depending on the strength of the spring for each detent, the plate is designed to be released in the event of a foreign object being lodged between the end of the conveyor and the plate. The unreliability of this type of article transfer means plays a key role in the limited acceptability that it has. For example, when the conveyor system is new, and the springs have a high compression rate, then the release of the transfer section requires a substantial force in order to be operative. On the other hand, over the years, and assuming multiple release episodes of the transfer section, the springs weaken and the surfaces of the detent are changed so that the release becomes easier. In such an event, the transfer section can literally fall out of the conveyor system of its own accord. This is especially true in an instance where the spring force is overcome when heavy articles are being conveyed.

Furthermore, in an arrangement such as shown in the '307 patent, the cost of the transfer section is unduly high. Also, there is no provision made for anti-friction transfer, such as by the inclusion of rollers. As a result, the speed of the articles being transferred must be increased in order to make certain that enough momentum remains in the articles to cause them to successfully cross the exit zone, as taught by the patent.

Accordingly, the need exists for a new type of conveyor transfer assembly for articles feeding along a feed path or transfer zone between two conveyors. A prerequisite is that the transfer assembly be simple and inexpensive to manufacture and substantially fool proof in operation. The transfer assembly should also be lightweight and supported freely on the conveyor support, preferably resting only by gravity, for easy and quick pop-up release in the event of a foreign object causing an article jam or the like.

Other arrangements prevalent in the prior art usually take the form of permanently mounted roller sections, wherein individual rollers are mounted on pairs of arms that are mechanically held in position for pivoting action. Again, this arrangement is such that the consistent avoidance of damage in the event that a jam occurs is very inconsistent. An example of this type of prior art arrangement is shown in the earlier U.S. Pat. No. 2,624,444, to Casabona issued Jan. 6, 1953. Thus, this line of technology also indicates that improvement is necessary to allow for a freer and more predictable release of the conveyor transfer section in the event of an article jam or the like.

SUMMARY OF THE INVENTION

Accordingly, in order to provide a more efficient manner of transferring articles in a conveyor system, I am proposing an improved conveyor transfer assembly to be positioned downstream of a feeding portion of a first conveyor and upstream of the receiving portion of a second conveyor. The transfer conveyor assembly of my invention allows more efficient feeding of articles, such as cartons, along the conveyor system. The concept is such that the smooth transfer of articles is assured, especially in a conveyor system utilizing modular link conveyors that are so popular in the food processing and packaging industry. The transfer assembly is adaptable to virtually any system wherein belt-type conveyors are used in an end to end relationship.

The conveyor transfer assembly includes a conveying surface on the top for moving the articles between the two conveyers. In the preferred embodiment of the present invention, the support means of the transfer section is freely resting by gravity on side plates of the frame of the conveyor system. It will be realized that in the event of an article jam, such as when any other foreign object becomes lodged on the upstream conveyor, the transfer assembly is easily lifted in a pop-up fashion and thereby released before any appreciable damage to the conveyor or the articles being transferred can occur.

Preferably, the conveying surface includes a plurality of rollers to assist the article in making the transition across the transfer zone. The rollers are mounted on a plurality of shafts extending transversely across the transfer zone and with a mounting block at each end of the shafts to secure the same in position. Furthermore, the preferred embodiment of the transfer assembly includes a recessed pan for holding the mounting blocks and positioning the rollers at the proper level. Advantageously, the pan is fabricated of lightweight metal in order to provide the necessary strength, but at the same time to be relatively easily lifted in the event that a jam occurs. Similarly, the mounting blocks and the rollers are made of lightweight plastic material. Preferably, the rollers are freely rotatable discs to allow easy feeding of the articles across the full width of the transfer zone.

The support means of the conveyor transfer assembly of the present invention advantageously includes a pair of tabs on each end of the support pan. The tabs in turn fit in a pair of open notches formed in the upper surface of the pair of upstanding side plates. Since the tabs rest in the notches only by gravity, in the event that a foreign object is present on the in-feed conveyor, the entire assembly is lifted and damage is prevented. Of course, the positioning of the tabs in the notches maintains the transfer assembly in its intended longitudinal position along the feed path defined by the conveyor during normal operation.

In order to allow a change in elevation in the transfer zone, the side plates include a means for allowing angular adjustment with respect to the frame of the conveyor system. In the preferred embodiment, the adjustments are made by simply loosening and tightening fasteners that are mounted in angular slots formed in the plates.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawing:

FIG. 1 is a side view illustrating the manner in which an article is transferred from a first upstream conveyor across a conveyor transfer assembly in accordance with the present invention to a second downstream conveyor;

FIG. 2 is a top view of the conveyor transfer assembly in position between the two conveyors;

FIG. 3 is an exploded view of the conveyor transfer assembly of the present invention and including the side plates upon which the assembly rests when in the operative position;

FIG. 4a is a schematic side view illustration of an incident where a foreign object is lodged under an article to cause a jam, but with a pop-up release of the transfer assembly in order to avoid damage; and FIG. 4b is a schematic side view showing the transfer assembly replaced along the conveying line and also illustrating the manner in which the side plates may be adjusted in order to change the elevation between the first and second conveyors.

Reference will now be made in detail to the present preferred embodiment of the invention, an example of which is illustrated in the accompanying drawings.

DETAILED DESCRIPTION OF THE PREFERRED EMBODIMENT

With reference now to FIG. 1 of the drawings, there is shown an area in a conveyor system 10 where a first conveyor 11 meets a second conveyor 12; the conveyor system 10 serving (as an example) as a continuous food handling or packaging line. For example, in a packaging line, the conveyor system 10 may be operating on a plurality of cartons C (only one shown in FIG. 1). The first and second conveyors 12 are preferably modular link conveyors which have been found over the years to be very efficient in this field of technology. The first conveyor 11 includes a belt 13 trained around a sprocket 14 at the end of its run (see flow arrows in FIG. 1). The conveyor 11 thus represents a feeding portion for the cartons C, or other articles, along the packaging line. Similarly, the conveyor 12 includes a modular link belt 15 operating about a sprocket 16 and representing in FIG. 1 a receiving portion of the belt 15 to pick-up the carton C after passing the transfer zone in between. The modular link conveyors 11, 12 are preferably of the type shown in U.S. Pat. No. 4,953,693, issued Sep. 4, 1990 and owned by the present assignee.

As disclosed in the '693 patent, the sprocket 14 for the first conveyor 11 may be driven by a shaft 20, the sprocket 16 being driven in a similar fashion by a shaft 21, and both shafts 20, 21 operating in a clockwise direction, as illustrated. The conveyor system 10 includes a frame, represented in the drawings by frame arms $F_1$, $F_2$, which in turn support the conveyor shafts 20, 21, respectively. For more detail with regard to the frame arms of a typical conveyor system of the type shown herein, reference can be made to the '693 patent. The frame of the conveyor system 10 also includes a pair of side plates, designated by the reference numerals 25, 25' (see FIGS. 1 and 2). As illustrated in FIG. 2, the shaft 20 is preferably driven by an electric motor $M_1$ and the shaft 21 is driven by a similar electric motor $M_2$. The two motors are controlled from a power source and controller P/C.

According to the improvement of the present invention, a conveyor transfer assembly, generally designated by the reference numeral 30, as illustrated in FIGS. 1–3, is provided. The purpose, as indicated above, is to allow a smooth and efficient transfer of the cartons C across the transfer zone from the feeding portion of the belt 13 of the first conveyor 11 to the receiving portion of the belt 15 of the second conveyor 12 (see in particular, FIG. 1). As illustrated, the carton C is, in effect, continuously conveyed, as represented by the dashed outline in FIG. 1, with substantially no loss of speed or control. As represented by the carton C, the driving force, represented by the action arrows, pushes each carton forward until the carton has fully passed the transfer zone and is picked up for positive feed by the belt 15 of the second conveyor 12. Of course, depending on the size of the carton C, or other article, momentum is sufficient to assure proper transfer.

However, as will be seen below, it is possible in accordance with the purposes of the present invention to tilt the conveyor transfer assembly 30 so as to supplement the feeding by gravity transfer. Furthermore, in accordance with the broadest aspects of the present invention, the transfer assembly 30 can include live or driven rollers so that continuous feeding is provided across the entire transfer zone.

As best shown in FIGS. 1 and 3, in the preferred embodiment the transfer assembly 30 includes a plurality of passive rollers 35, each roller including a plurality of short segments 35a, 35b . . . 35n. In effect, the rollers 35 forming the conveyor surface on the top of the transfer assembly 30 allow the carton C to readily make the transition from the first conveyor 11 to the second conveyor 12.

As best shown in FIG. 3, the rollers 35 of the transfer assembly 30 include a support means, generally designated by the reference numeral 40. As illustrated, the support means includes a pair of mounting blocks 41, 42 in which the ends of shafts 43 for the rollers 35 are held (see FIG. 3). In addition, the support means 40 includes a recessed pan 44 in which the mounting blocks 41, 42 are fixed by suitable fasteners 45.

At the ends of the recessed pan 44, in which the mounting blocks 41, 42 are fastened, there is provided a pair of support tabs 50, 51. Matched with the tabs 50, 51 are a pair of notches 52, 53 on the upstanding side plates 25, 25' of the frame of the conveyor system.

As will now be apparent, and in accordance with the advantageous feature of the present invention, the entire conveyor transfer assembly 30 is positioned in the transfer zone between the first conveyor 11 and the second conveyor 12 by simply engaging the tabs 50, 51 in the respective notches 52, 53. The tabs hold the transfer assembly 30 in position in the direction of flow from the cartons C, C', C" but in the event of a jam, the transfer assembly is available to be lifted in a pop-up fashion to prevent damage. Forwardly and rearwardly directed stripper fingers 44a, 44b assist in this function (see FIGS. 4a, 4b).

Also as shown in FIG. 3, the frame of the conveyor system (only frame arm $F_2$ being shown) is adjustable attached for support of the side plates 25, 25' by fasteners 55 that thread into fixed nuts 56. As illustrated, the side plates 25, 25' include curved slots 57 to receive the fasteners 55. In this manner, the plates 25, 25' can be adjusted with respect to the two conveyors 11, 12 (see FIG. 4a). Once the fasteners 55 are tightened, the plates 25, 26 are secured in place and the transfer assembly 30 is positioned at the desired angle so that the cartons C continue to be transferred efficiently.

In operation, the cartons C, C', C" representing articles being transferred between the first conveyor 11 and the second conveyor 12 flow in a regular spacing, as shown in FIG. 4a. When the plates 25, 26 are positioned at an angle where the two conveyors come together at different levels, the cartons C, C', C" are illustrated as shown in the dashed line outline.

With reference to FIG. 4a, there is shown a foreign object F caught within a recess or pocket of the modular conveyor belt 13 under the carton C. As illustrated, the foreign object F engages one or more of the stripper fingers 44a, causing a jam but easily allowing the edge of the transfer assembly 30 to be lifted. As will be understood, the leading cartons C', C" are already passed the transfer zone and being supported in total or in part by the belt 15 of the second conveyor 12. Since the transfer assembly 30 is lifted upon engagement with the foreign object F, there can be no damage to the conveyors 11, 12 or to the cartons C or other articles being conveyed. Furthermore, once the transfer assembly 11 is lifted, in accordance with another feature of the present invention, a microswitch 60 that is placed in the circuit with the motors $M_1$, $M_2$ and the power/controller P/C, controls both conveyors 11, 12 causing a feed interruption. One microswitch 60 is shown mounted on each upstanding side plate 25, 25' (see FIGS. 2 and 3). In both instances, the feeler arm (not numbered) of each microswitch 60 is depressed by the tabs 50, 51 during normal operation, and then when the transfer assembly 30 pops-up, one of the switches 60 is opened, and the power to the motors $M_1$, $M_2$ is interrupted through the power/controller P/C (FIG. 2).

In summary, it will be realized that an improved conveyor system for articles, such as cartons C, is provided. A simplified and low cost conveyor transfer assembly 30 allows articles to be fed along the system in a smooth and efficient manner spanning between first and second conveyors 11, 12. The rollers 35 provide an efficient conveying surface for allowing the articles to move directly from the feeding portion of the first conveyor 11 to the receiving portion of the second conveyor 12. The 30 support means 40, including the tabs 50, 51 resting within notches 52, 53 of the side plates 25, 25' allow the entire assembly 30 to pop-up in the event there is an article jam or the like. Furthermore, as an extra feature, microswitches 60 can be positioned to sense when the tabs 50, 51 are displaced by upward movement of the assembly 30 so that the conveyor system is interrupted.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. In a conveyor system for articles including a first conveyor having a feeding portion and a second conveyor having a receiving portion and a frame between said portions, the improvement comprising:

a conveyor transfer assembly for articles feeding along the system spanning between said conveyor portions;

a conveying surface on top of said transfer assembly for moving said articles from said feeding portion to said receiving portion; and support means of said transfer assembly freely resting by gravity on said frame means and substantially fully releasable therefrom;

whereby an article jam or the like adjacent said transfer assembly causes said assembly to be bodily lifted and released to prevent damage.

2. The conveyor transfer assembly in a conveyor system of claim 1, wherein said conveying surface includes a plurality of rollers.

3. The conveyor transfer assembly in a conveyor system of claim 2, wherein said rollers comprise a plurality of shafts extending transversely across said transfer assembly for carrying said rollers.

4. The conveyor transfer assembly in a conveyor system of claim 3, wherein said support means includes a mounting block at each end of said shafts to secure in position across the span between said conveyor portions.

5. The conveyor transfer assembly in a conveyor system of claim 4, wherein said support means of said conveyor transfer assembly further includes a recessed pan for holding said mounting blocks and positioning the upper surface of said rollers so that said conveying surface provides a smooth transition for said articles between said portions.

6. The conveyor transfer assembly in a conveyor system of claim 5, wherein said rollers include a plurality of freely rotatable discs on each shaft and extending substantially across the full width of said conveyor transfer assembly.

7. The conveyor transfer assembly in a conveyor system of claim 5, wherein said support means also comprises a pair of tabs on each end of said pan, and a pair of open notches on said frame means to receive said tabs to provide the freely resting relationship.

8. The conveyor transfer assembly in a conveyor system of claim 7, wherein said frame means includes a pair of upstanding plates, one at each end of said transfer assembly; said pair of open notches being formed in the upper edge of the corresponding plate.

9. The conveyor transfer assembly in a conveyor system of claim 8, wherein is provided means for adjusting the angular position of the plates with respect to said conveyor portions.

10. The conveyor transfer assembly in a conveyor system of claim 9, wherein said adjusting means includes angular slots in said plates, and fasteners on said transfer assembly and extending through said slots and fixed in position for holding said assembly in adjusted position.

11. The conveyor transfer assembly in a conveyor system of claim 1, wherein is further provided power means to drive said conveyors and switch means to interrupt the operation upon sensing the lifting of said assembly.

\* \* \* \* \*